United States Patent
Burgschat et al.

(10) Patent No.: US 6,865,820 B2
(45) Date of Patent: Mar. 15, 2005

(54) DEVICE AND METHOD FOR ATTACHING A SCALE ELEMENT OR A PROTECTIVE TAPE THEREFOR

(75) Inventors: Reiner Burgschat, Jena (DE); Robert Stelzner, Göttern (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/612,721

(22) Filed: Jul. 2, 2003

(65) Prior Publication Data
US 2004/0154180 A1 Aug. 12, 2004

(30) Foreign Application Priority Data
Jul. 3, 2002 (DE) .......................... 102 29 888

(51) Int. Cl.$^7$ .................... G01B 21/16; G01B 21/02
(52) U.S. Cl. ................. 33/706; 33/701; 33/702
(58) Field of Search ................. 33/701–703, 706–708

(56) References Cited

U.S. PATENT DOCUMENTS

| | | | | |
|---|---|---|---|---|
| 2,742,705 A | * | 4/1956 | Gelardi ...................... 33/758 |
| 4,835,830 A | * | 6/1989 | Miller ........................ 29/447 |
| 4,936,023 A | * | 6/1990 | Pechak ........................ 33/706 |
| 5,016,359 A | * | 5/1991 | Nagaoka et al. ............. 33/702 |
| 5,063,685 A | | 11/1991 | Morrison et al. ............. 33/701 |
| 5,485,680 A | * | 1/1996 | Nelle .......................... 33/705 |
| 6,049,992 A | | 4/2000 | Freitag et al. ............... 33/700 |
| 6,105,271 A | * | 8/2000 | Freitag et al. ............... 33/706 |
| 6,349,481 B1 | * | 2/2002 | Nelle .......................... 33/702 |
| 2004/0045182 A1 | * | 3/2004 | Freitag et al. ............... 33/706 |

FOREIGN PATENT DOCUMENTS

DE  197 00 367 C2  7/1999  ............ G01B/3/00
EP  0 388 453 B1  6/1993  ............ G01B/3/00

OTHER PUBLICATIONS

Dr. Johannes Heidenhain GmbH publication entitled "NC–Längenmeβsystem," published by Dr. Johannes Heidenhain GmbH, Sep. 1998, pp. 58–59.

* cited by examiner

Primary Examiner—R. Alexander Smith
(74) Attorney, Agent, or Firm—Brinks Hofer Gilson & Lione

(57) ABSTRACT

A device for the directional attachment of a scale element of a linear position measuring system to an installation face of a first body. The device includes a first body, a second body comprising a scanning head, which is movable in a measuring direction in relation to said first body, and a scale element is aligned parallel with respect to the measuring direction and a profiled alignment device is provided on the second body, which works together with a complementary tape profile on the scale element for aligning the scale element.

13 Claims, 3 Drawing Sheets

DEVICE AND METHOD FOR ATTACHING A SCALE ELEMENT OR A PROTECTIVE TAPE THEREFOR

Applicants claim, under 35 U.S. C. § 119, the benefit of priority of the filing date of Jul. 3, 2002 of a German patent application, copy attached, Ser. No. 102 29 888.2, filed on the aforementioned date, the entire contents of which is incorporated herein by reference.

BACKGROUND OF THE INVENTION

1. Field of the Invention

The present invention relates to a device for the attachment of a scale element, such as a scale or a scale support or a scale guide device, of a linear measuring system to an attachment face of a first body. It further relates to an associated scale element, such as a scale or scale support or scale guide device, of a linear measuring system, to a protective tape for a scale or a scale support or a scale guide device of a linear measuring system, and to a method for the attachment of a scale element, such as a scale or a scale support or a scale guide device, of a linear measuring system to an attachment face of a first body.

2. Discussion of Related Art

Such scales can be attached to machine tools or coordinate-measuring machines. The machines have at least two elements, which can be moved with respect to each other. The scale is affixed to one of the two elements and is then used, together with a scanning head located at the other of the two elements, for measuring the relative movement of the two elements.

Often, very long scales are needed for such position measurements at machine tools or coordinate-measuring machines. The scales must be fastened, aligned parallel with the measuring direction, wherein the measuring direction is predetermined by the guide devices of the machine tool or measuring machine.

Various steps have already been proposed for the attachment of scales.

In accordance with EP 0 388 453 131, a self-adhesive tape scale is glued on by an adjustment device and is aligned in the direction of the guide sequence of a carriage of a machine tool or measuring machine. This type of fastening offers a good allocation of the tape scale to the scanning head, but can only be employed for highly elastic scales in tape form. The adjustment device is always attached to the carriage in place of the scanning head, so that the scanning head must be removed for aligning the tape scale, the adjustment device must be attached, then removed again after alignment, and the scanning head must be attached again. As a whole, this is very cumbersome.

It is alternatively possible, such as described in DE 197 00 367 A1, to provide lateral contact elements for aligning a scale, against which the measuring tape is placed.

An also widely used fastening method for thin scales consists in introducing the scale into a groove of a scale support. This is described on pages 58 and 59 of the company publication "NC Längenmeβsysteme" [NC Linear Measuring Systems] of the firm Dr. Johannes Heidenhain GmbH of September 1998. In this case, scale supports made of extruded aluminum are affixed to a fastening surface with an adhesive tape with glue on both sides, and thereafter a scale is pushed into the receiving groove of the profile. Here, too, the problem of aligning the scale support exactly parallel with the measuring direction also exists.

Alternatively there is the option of initially attaching a scale guide device aligned with the installation face, on which it is then possible in turn to align the scale itself.

Adjusting devices are always provided in connection with the attachment methods for scales, scale guide devices and scale supports so far known, which are attached for this purpose to the machine tool or coordinate-measuring machine, and then must be removed again from the machine after the scale or the scale support have been attached.

OBJECT AND SUMMARY OF THE INVENTION

An object of the present invention is based on providing a less cumbersome device, by which scale elements, such as scales, scale supports or scale guide devices, can be aligned in a simple manner during their attachment to a machine tool or a coordinate-measuring machine.

This object is attained on the one hand by a device for the directional attachment of a scale element of a linear position measuring system to an installation face of a first body. The device includes a first body, a second body comprising a scanning head, which is movable in a measuring direction in relation to said first body, and a scale element is aligned parallel with respect to the measuring direction and a profiled alignment device is provided on the second body, which works together with a complementary tape profile on the scale element for aligning the scale element.

With this device for the directional attachment of a scale element, such as a scale or a scale support or a scale guide device, of a linear position measuring system to an installation face of a first body, wherein a second body, which is movable in a measuring direction in relation to the first body is provided, and wherein the scale or the scale support or the scale guide device can be aligned parallel with this measuring direction, wherein the second body has a scanning head, a profiled alignment device is provided on the second body which, for the alignment of the scale or the scale support or the scale guide device, works together with a complementary tape profile on the scale or the scale support or the scale guide device.

In accordance with the present invention the second body is directly employed for aligning the scale, without it being necessary for an adjustment device to be attached to the second body, which would have to be removed again from the second body after the alignment. In that case the second body can be either the machine bed or a movable carriage of the machine. The alignment is performed by the profiled alignment device on the second body and of the tape profile at the scale or the scale support. In the course of the alignment, the scanning head is already located on the second body and need to be removed and thereafter again attached for the alignment.

The tape profile is preferably attached to a protective tape applied to the scale or the scale support of the scale guide device. Such a protective tape is normally provided in the form of a self-adhesive foil for protecting the scale, in particular the graduation provided thereon, against damage during the alignment and attachment. The protective tape in accordance with the present invention now has the tape profile, which works together with the profiled alignment device on the second body of the machine for aligning the scale or the scale support or the scale guide device. Following the alignment, the profiled protective tape is pulled off the scale or the scale support or the scale guide device, in the course of which the spacing for scanning required for the measurement is created.

The profiled alignment device is provided on a scanning head which is a part of the second body. In that case the profiled protective tape can simultaneously be used for setting the spacing for scanning in the course of the assembly of the scanning head on a machine element, i.e. the second body. To this end it is necessary to select the thickness of the protective tape in accordance with the desired spacing for scanning.

The profiled alignment device can be provided in the form of at least one recess and/or at least one protrusion. The device furthermore can have a pusher device for pressing the scale or the scale support or the scale guide device against the installation face of the machine.

The object is furthermore attained by a method for the directional attachment of a scale element of a linear position measuring system to an installation face of a first body. The method includes providing a second body having a scanning head, which is movable in a measuring direction in relation to a first body, and aligning a scale element parallel with respect to the measuring direction. Providing a profiled alignment device on the second body, which works together with a complementary tape profile on the scale element for aligning the scale element.

The present invention will be explained in greater detail in what follows by the drawings.

DETAILED DESCRIPTION OF THE PREFERRED EMBODIMENTS

A preferred embodiment of the device in accordance with the present invention will now be described in greater detail, making reference to the drawings.

Figure 1:
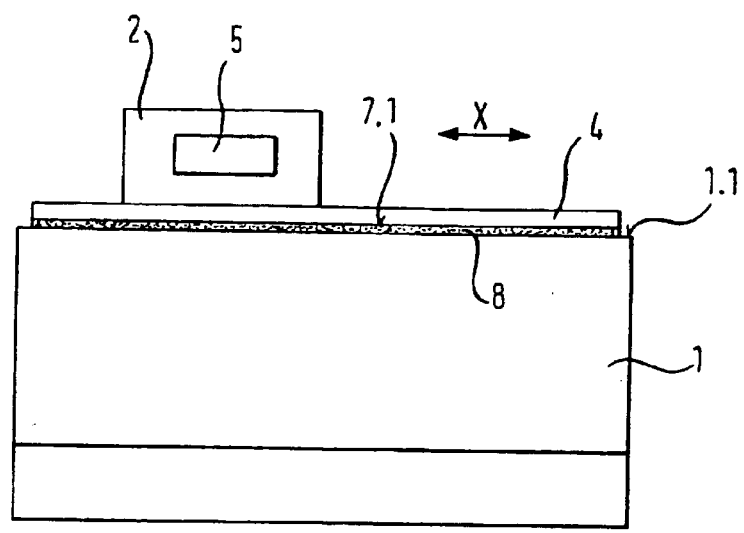
FIG. 1 is a lateral view of an embodiment of a coordinate-measuring machine in accordance with the present invention.
Figure 2:
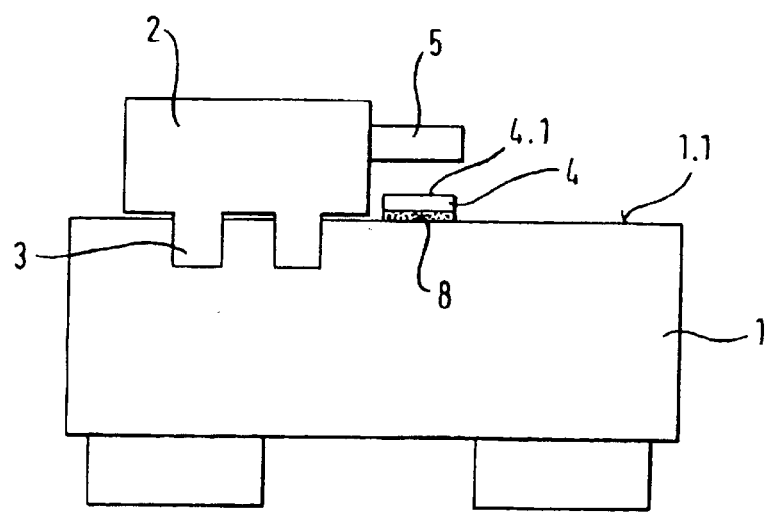
FIG. 2 is a front view of the coordinate-measuring machine of FIG. 1.

A coordinate-measuring machine, having a machine base 1 and a carriage 2, is represented in FIGS. 1 and 2. The carriage 2 can be displaced in a longitudinal direction X along a linear guide 3. A linear measuring system, including a scale 4 and a scanning head 5, is used for determining the position of the carriage 2 in relation to the base 1.

In the example represented in FIGS. 1 and 2, the scale 4 is a metal tape, which on its underside 7.1 is provided with a foil 8 with an adhesive on both sides.

So that in the course of the movement of the carriage 2 in relation to the bed 1 the scanning head 5 can continuously scan the graduation 4.1 of scale 4 in a contactless manner, the scale 4 must be fastened on the bed 1 parallel with the displacement direction X of the scanning head 5, and therefore of the carriage 2.

In accordance with the present invention, a profiled alignment device 11, 11', 11", 11''' is provided on the scanning head 5, as well as a complementary tape profile on the scale 4 to be aligned. The tape profile is located on a profiled protective tape 9, by which the scale 4 is covered during alignment. Such a protective tape 9 is simultaneously used for protecting the graduation of the scale 4 against damage during the alignment, in order to prevent later measurement errors because of scratches etc. on the graduation.

In the course of the alignment of the scale 4, the profiled alignment device 11 on the scanning head 5 and the tape profile on the protective tape 9 work together. As stated, the scale 4 is provided with an adhesive foil 8 on its underside. In the course of the alignment process, this adhesive foil 8 is slowly pulled off the underside of the scale 4, and the aligned areas of the scale 4 are pushed onto the bed 1 and fixedly glued to the bed 1 by the adhesive foil 8. Pushing the scale 4 down can be performed manually or by a pusher device, for example by the pusher arrangement described with respect to FIG. 5.

Figure 3A:
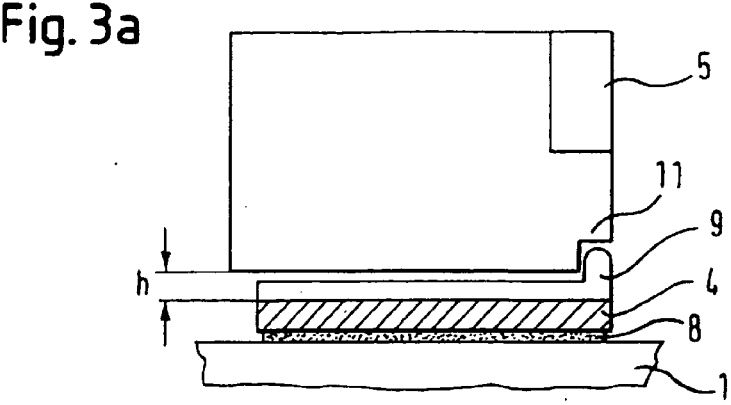
FIGS. 3a–3d represents four different embodiments of profiled alignment devices and tape profiles in accordance with the present invention for aligning the scale of the coordinate-measuring machine of FIG. 1 in accordance with the present invention.
Figure 3B:
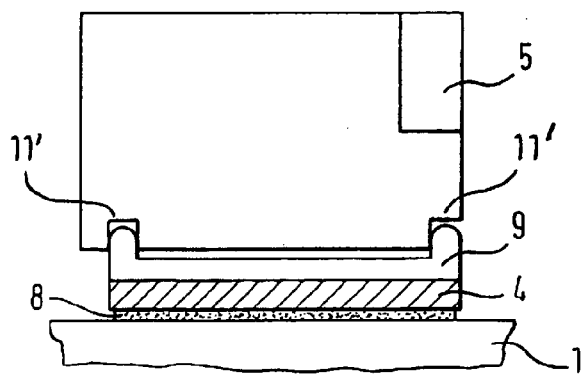
Figure 3C:
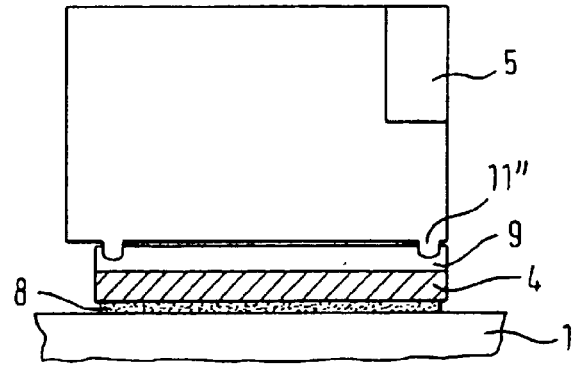
Figure 3D:
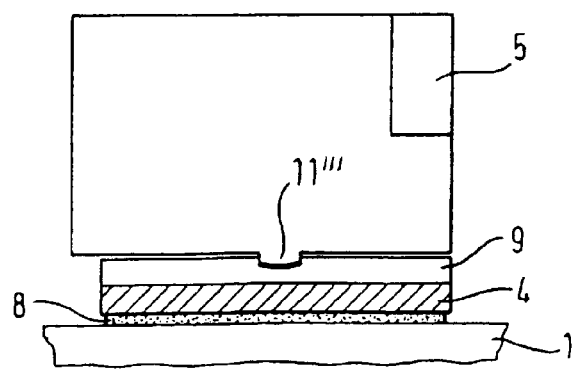

Following the alignment and gluing of the scale 4, the profiled protective tape 9 is pulled off the scale 4, in the course of which the spacing h for scanning (see FIG. 3a) between the scale 4 and the scanning head 5, required for a measurement, results in case of a suitable thickness of the protective tape 9.

FIGS. 3a to 3d shows four different possibilities for designing the profiled alignment device 11, 11', 11", or 11''', as well as of the complementary tape profile at the protective tape 9 for aligning a scale 4. Other combinations of recesses and protrusions are of course also conceivable, as long as the profiled alignment device 1 1 and the tape profile of the protective tape 9 match in such a way that the scale 4 is aligned during a movement of the scanning head 5 in the measuring direction by the cooperating profiled elements.

Figure 4:
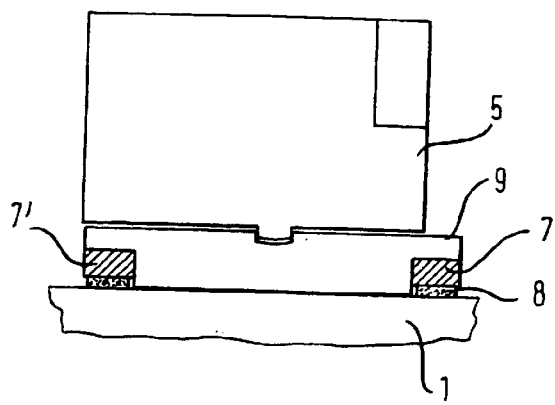
FIG. 4 shows an embodiment of a device in accordance with the present invention for aligning a scale guide device of the coordinate-measuring machine of FIG. 1 in accordance with the present invention.

FIG. 4 shows a modification of the device in accordance with the present invention, which is here used for aligning a scale guide device in the form of two guide strips 7, 7', which have the profiled protective tape 9 in accordance with the invention. The remaining elements of the device in FIG. 4 correspond to those in FIGS. 3a to 3d. In a further modification, represented in FIG. 6, the protective tape 9 can also be provided on a scale support 13 to be aligned, which has a groove 6, into which a scale or a measuring tape 4 is inserted following the alignment of the scale support 13.

Figure 5:
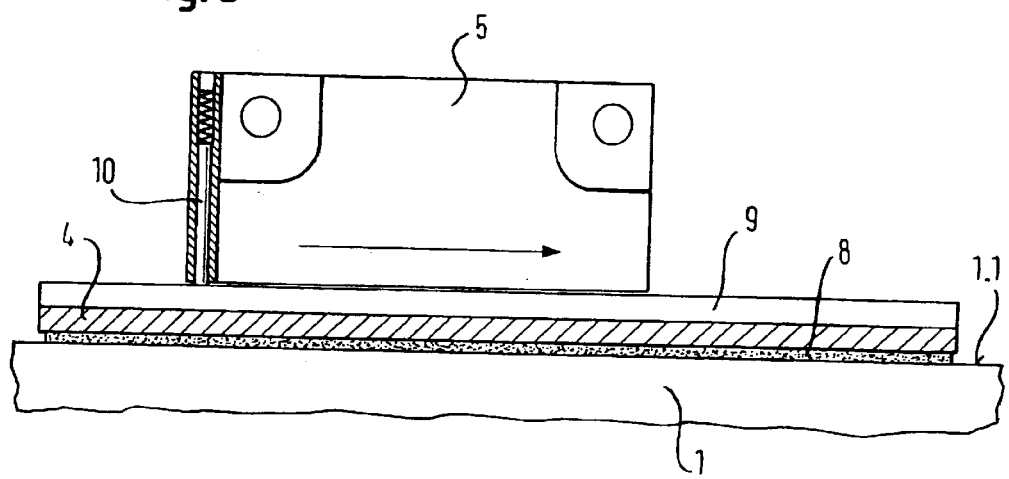
FIG. 5 shows a second embodiment of a device in accordance with the present invention, which furthermore has an embodiment of a pusher device in accordance with the present invention.
Figure 6:
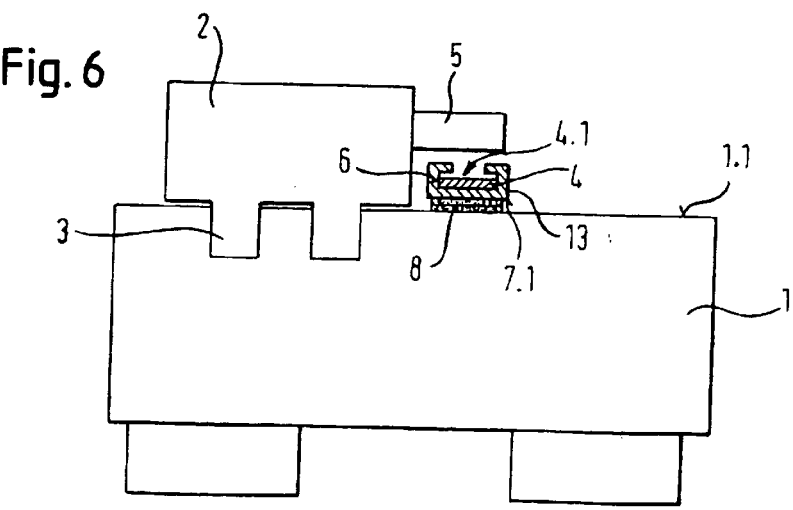
FIG. 6 shows an embodiment of a device in accordance with the present invention for aligning an embodiment of a scale support in accordance with the present invention.

FIG. 5 shows a lateral view of a device in accordance with the present invention, which in addition has a pusher arrangement 10. After the scale 4 has been aligned by the cooperating profiled elements (not visible here), it can be pressed against the installation face 1.1 of the machine bed 1 by this pusher arrangement 10, so that it is fastened on the installation face 1.1 by the adhesive foil 8. The direction of measurement, i.e. the direction of movement of the scanning head 5 with respect to the machine bed 1 is indicated by an arrow in FIG. 5. Finally, FIG. 6 shows a device in accordance with the present invention for aligning a scale support. A scale 4, for example a metal strip, is positively fastened here in a groove 6 of a scale support 13. So that in the course of the movement of the carriage 2 in relation to the bed 1, the scanning head 5 can continuously scan the graduation 4.1 of the scale 4 without touching it, the scale support 13 must be fastened aligned parallel with the displacement direction of the carriage 2. The scale support 13 is provided on its underside 7.1 with a foil 8 with adhesive on both sides. The scale 4 itself can be fastened to the scale support 13 already during the alignment, or can be inserted into the groove 6 of the scale support 13 only after being glued on.

Further exemplary embodiments exist within the scope of the present invention besides the described examples.

We claim:

1. A device for the directional attachment of a scale element of a linear position measuring system to an installation face of a first body, the device comprising:
   a first body comprising an installation face;
   a second body comprising a scanning head, which is movable in a measuring direction in relation to said first body;
   a scale element of a linear position measuring system is aligned parallel with respect to said measuring direction; and
   a profiled alignment device is provided on said second body, which works together with a complementary tape profile on said scale element for aligning said scale element with respect to said installation face of said first body.

2. The device in accordance with claim 1, wherein said scale element comprises a scale.

3. The device in accordance with claim 1, wherein said scale element comprises a scale support.

4. The device in accordance with claim 1, wherein said scale element comprises a scale guide device.

5. The device in accordance with claim 1, wherein said tape profile is provided on a removable protective tape of said scale element.

6. The scale element in accordance with claim 5, wherein said protective tape can be rolled up.

7. The scale element in accordance with claim 5, wherein said protective tape is self-adhesive and is of low adhesion.

8. The device in accordance claim 1, wherein said profiled alignment device is provided in the form of at least one recess.

9. The device in accordance with claim 1, wherein said profiled alignment device is provided in the form of at least one protrusion.

10. The device in accordance with claim 1, further comprising a pusher arrangement that presses said scale element against said installation face.

11. A method for the directional attachment of a scale element of a linear position measuring system to an installation face of a first body, comprising:
    providing a second body comprising a scanning head, which is movable in a measuring direction in relation to a first body which comprises an installation face,
    aligning a scale element of a linear position measuring system parallel with respect to said measuring direction;
    providing a profiled alignment device on said second body, which works together with a complementary tape profile on said scale element for aligning said scale element with respect to said installation face of said first body.

12. The method in accordance with claim 11, further comprising pressing said scale element against said installation face after said aligning said scale element.

13. The method in accordance with claim 11, further comprising providing said tape profile on a protective tape, which is pulled off said scale element after said aligning said scale element.

* * * * *